United States Patent
Xie et al.

(10) Patent No.: US 11,352,103 B2
(45) Date of Patent: Jun. 7, 2022

(54) TRAWLER WITH FISHING AND CONVEYING DEVICE AND FISHING METHOD

(71) Applicant: ZHEJIANG OCEAN UNIVERSITY, Zhoushan (CN)

(72) Inventors: Yonghe Xie, Zhoushan (CN); Guibiao Wang, Zhoushan (CN); Wei Wang, Zhoushan (CN); Junlai Li, Zhoushan (CN)

(73) Assignee: ZHEJIANG OCEAN UNIVERSITY, Zhoushan (CN)

( * ) Notice: Subject to any disclaimer, the term of this patent is extended or adjusted under 35 U.S.C. 154(b) by 58 days.

(21) Appl. No.: 17/113,049

(22) Filed: Dec. 6, 2020

(65) Prior Publication Data
US 2021/0171162 A1    Jun. 10, 2021

(30) Foreign Application Priority Data
Dec. 6, 2019    (CN) .......................... 201911243042.7

(51) Int. Cl.
| | | |
|---|---|---|
| *B63B 35/18* | (2006.01) | |
| *A01K 73/06* | (2006.01) | |
| *B66D 1/02* | (2006.01) | |
| *B66D 1/30* | (2006.01) | |

(52) U.S. Cl.
CPC .............. *B63B 35/18* (2013.01); *A01K 73/06* (2013.01); *B66D 1/02* (2013.01); *B66D 1/30* (2013.01); *B66D 2700/0183* (2013.01)

(58) Field of Classification Search
CPC ........ B63B 35/14; A01K 73/02; A01K 73/06; B66D 2700/0183; B66D 1/02; B66D 1/30
See application file for complete search history.

(56) References Cited

U.S. PATENT DOCUMENTS

| | | | | | |
|---|---|---|---|---|---|
| 763 | A * | 6/1838 | Hale | ...................... | A01K 73/06 43/8 |
| 257,597 | A * | 5/1882 | Long | ...................... | A01K 73/06 43/8 |
| 393,158 | A * | 11/1888 | Joyce | ...................... | A01K 73/06 43/8 |
| 753,168 | A * | 2/1904 | Scott | ...................... | A01K 73/06 254/327 |

(Continued)

FOREIGN PATENT DOCUMENTS

| | | |
|---|---|---|
| CN | 102691341 A | 9/2012 |
| CN | 203709079 U | 7/2014 |

(Continued)

*Primary Examiner* — Michael E Gallion
(74) *Attorney, Agent, or Firm* — True Shepherd LLC; Andrew C. Cheng

(57) ABSTRACT

The present disclosure provides a trawler with a fishing and conveying device and a fishing method, and belongs to the technical field of trawlers. The trawler of the present disclosure includes a hull structure and two fishing devices, wherein the fishing device includes a first rotary rod, a second rotary rod, a fixing frame and a fish suction mechanism, the first rotary rod is hinged at the bow of the hull structure, a fishing net is connected on the first rotary rod, the second rotary rod is hinged at the stern of the hull structure. The present disclosure is capable of realizing continuous fishing and directly conveying the fish onto the trawler, and thus is simple to operate.

10 Claims, 4 Drawing Sheets

(56) References Cited

U.S. PATENT DOCUMENTS

| | | | | | |
|---|---|---|---|---|---|
| 796,709 | A | * | 8/1905 | Cornet | A01K 73/06 43/8 |
| 827,076 | A | * | 7/1906 | Bolitho | A01K 73/06 43/100 |
| 876,148 | A | * | 1/1908 | Cloud | A01K 73/06 43/8 |
| 919,107 | A | * | 4/1909 | Yancey | A01K 73/06 254/359 |
| 981,918 | A | * | 1/1911 | Davidson | A01K 73/06 43/14 |
| 1,070,232 | A | * | 8/1913 | Curol | A01K 73/06 43/8 |
| 1,133,120 | A | * | 3/1915 | Fountain, Jr. | A01K 73/06 43/8 |
| 1,152,038 | A | * | 8/1915 | Morse | A01K 73/06 43/7 |
| 1,154,563 | A | * | 9/1915 | Dorsey | A01K 73/06 43/8 |
| 1,924,391 | A | * | 8/1933 | Bardon | B63J 3/02 254/300 |
| 2,417,121 | A | * | 3/1947 | Nelson | A01K 73/06 414/142.8 |
| 2,648,918 | A | * | 8/1953 | Mazzella | A01K 80/00 37/316 |
| 2,673,415 | A | * | 3/1954 | Strom | A01K 73/12 43/4.5 |
| 2,733,531 | A | * | 2/1956 | Puretic | A01K 73/06 254/358 |
| 2,810,979 | A | * | 10/1957 | Puretic | A01K 73/06 43/8 |
| 2,890,543 | A | * | 6/1959 | Mitchell | A01K 73/02 43/9.1 |
| 3,091,880 | A | * | 6/1963 | Puretic | B63B 35/24 414/137.7 |
| 3,113,394 | A | * | 12/1963 | Puretic | A01K 73/02 43/6.5 |
| 3,124,890 | A | * | 3/1964 | Puretic | A01K 73/06 43/6.5 |
| 3,266,777 | A | * | 8/1966 | Vittone | A01K 73/06 43/14 |
| 3,300,187 | A | * | 1/1967 | Krogstad | B66D 1/741 114/230.22 |
| 3,300,189 | A | * | 1/1967 | Blount | A01K 73/06 254/303 |
| 3,307,284 | A | * | 3/1967 | Luketa | A01K 73/06 43/4.5 |
| 3,314,184 | A | * | 4/1967 | Lerch | A01K 79/00 43/4.5 |
| 3,315,914 | A | * | 4/1967 | Turner | B65H 75/425 242/390.8 |
| 3,469,819 | A | * | 9/1969 | Puretic | A01K 73/06 43/8 |
| 3,603,016 | A | * | 9/1971 | Ursich | A01K 73/06 43/8 |
| 3,687,418 | A | * | 8/1972 | Halvorsen | B66D 1/741 414/142.8 |
| 3,707,799 | A | * | 1/1973 | Hatley | A01K 73/06 43/8 |
| 3,765,614 | A | * | 10/1973 | Bartl | A01K 73/06 242/387 |
| 3,793,760 | A | * | 2/1974 | Puretic | A01K 73/06 43/4.5 |
| 3,831,311 | A | * | 8/1974 | Cushing | A01K 73/06 43/6.5 |
| 3,938,274 | A | * | 2/1976 | Seymour | A01K 73/12 43/4.5 |
| 4,449,315 | A | * | 5/1984 | Puretic | A01K 73/12 43/8 |
| 4,490,936 | A | * | 1/1985 | Svendsen | A01K 73/06 254/332 |
| 4,511,122 | A | * | 4/1985 | Svendsen | A01K 73/06 254/394 |
| 4,558,990 | A | * | 12/1985 | Roach | F04F 5/466 43/4.5 |
| 4,756,671 | A | * | 7/1988 | Grimes | F04F 1/18 43/4.5 |
| 5,020,464 | A | * | 6/1991 | Rodrigues | A01K 77/00 43/65 |
| 5,351,430 | A | * | 10/1994 | Hystad | B66D 1/50 254/273 |
| 5,738,036 | A | * | 4/1998 | Jones | B63B 35/14 210/776 |
| 6,453,596 | B1 | * | 9/2002 | Marco | A22B 3/06 43/4.5 |
| 7,325,356 | B2 | * | 2/2008 | Norman | A01K 77/00 43/6.5 |
| 10,039,270 | B2 | * | 8/2018 | Ma | A01K 73/04 |
| 2005/0087119 | A1 | * | 4/2005 | Pedersen | B63B 35/26 114/364 |
| 2020/0010309 | A1 | * | 1/2020 | Atsumi | A01G 3/086 |
| 2020/0113160 | A1 | * | 4/2020 | Larsen | A01K 73/06 |
| 2021/0171161 | A1 | * | 6/2021 | Xie | B66D 1/30 |

FOREIGN PATENT DOCUMENTS

| | | | | |
|---|---|---|---|---|
| CN | 104746604 A | | 7/2015 | |
| CN | 206324063 U | | 7/2017 | |
| CN | 207201782 U | | 4/2018 | |
| CN | 108271746 A | | 7/2018 | |
| CN | 108438154 A | * | 8/2018 | A01K 73/02 |
| CN | 108502113 A | | 9/2018 | |
| CN | 108502113 A | * | 9/2018 | A01K 74/00 |
| CN | 108860486 A | | 11/2018 | |
| CN | 208402960 U | | 1/2019 | |
| CN | 109479840 A | | 3/2019 | |
| DE | 3543253 A | * | 6/1987 | A01K 73/04 |
| DK | 8503812 A | * | 2/1987 | A01K 73/06 |
| FR | 2268465 A | * | 12/1975 | A01K 73/06 |
| GB | 2170468 A | * | 8/1986 | A01K 73/06 |
| KR | 2018010832 A | * | 1/2018 | A01K 73/06 |
| KR | 2018017992 A | * | 2/2018 | A01K 73/00 |
| WO | WO-9632008 A1 | * | 10/1996 | A01K 73/06 |
| WO | WO-03059731 A1 | * | 7/2003 | A01K 73/02 |
| WO | 2018/174723 A1 | | 9/2018 | |

* cited by examiner

TRAWLER WITH FISHING AND CONVEYING DEVICE AND FISHING METHOD

CROSS-REFERENCE TO RELATED APPLICATIONS

This application claims priority to Chinese Patent Application No. 201911243042.7 with a filing date of Dec. 6, 2019. The content of the aforementioned application, including any intervening amendments thereto, are incorporated herein by reference.

TECHNICAL FIELD

The present disclosure belongs to the technical field of trawlers, and relates to a trawler with a fishing and conveying device and a fishing method.

BACKGROUND

Trawling is a fishing operation method by which a fishing vessel forces fishing objects into a bag-shaped net by towing the bag-shaped net. The trawling method can trawl fish schools actively and flexibly, and is mainly used in the oceans as well as inland waters. Fishing objects mainly include fish, shrimps and molluscs at or near bottom bed, such as codfish, herring, hairtail, black scraper, large yellow croaker, small yellow croaker, squid, calamary, flounder, shrimps and crabs in the oceans and Gymnocypris przewalskii, coilia ectenes, silverfish and white shrimp in inland waters.

Trawling is one of the commonest fishing methods in modern times. In a trawling process, after fish in a fishing net reaches a certain number, the fishing net is firstly hauled onto a fishing vessel with a net hauler on the fishing vessel and then opened manually to pour the fish out of the fishing net, and then thrown out again. In this way, the above actions are repeated continuously. This process is time and labor consuming and low in fishing efficiency.

SUMMARY

To solve the above problems in the prior art, the present disclosure provides a trawler with a fishing and conveying device and a fishing method, which can realize continuous fishing and directly convey the fish in a fishing net onto the trawler, thereby saving time and labour.

The object of the present disclosure may be achieved by the following technical solution.

A trawler with a fishing and conveying device includes a hull structure and two fishing devices. The two fishing devices are located at portside and starboard of the hull structure respectively, and the fishing device includes: a first rotary rod, hinged at the bow of the hull structure through a first hinge shaft, where an axial direction of the first hinge shaft is consistent with a length direction of the hull structure, and a fishing net is connected on the first rotary rod;

a first driving unit, being capable of driving the first rotary rod to rotate around the first hinge shaft;

a second rotary rod, hinged at the stern of the hull structure through a second hinge shaft, where an axial direction of the second hinge shaft is consistent with the length direction of the hull structure, a mounting plate is fixed at an end of the second rotary rod away from the second hinge shaft, the mounting plate is provided with a through-hole and a third winch, and a third wire rope is wound on a drum of the third winch;

a second driving unit, being capable of driving the second rotary rod to rotate around the second hinge shaft;

a fixing frame, where a free end of the third wire rope passes through the through-hole and is fixedly connected with the fixing frame, a left end of the fixing frame is detachably connected with the bottom of the fishing net, a right end of the fixing frame is fixed with a connection pipe, a tapered pipe is rotatably disposed in an opening at the left end of the fixing frame, an opening at a left end of the tapered pipe is greater than an opening at a right end of the tapered pipe, a spiral deflector is disposed on an inner side wall of the tapered pipe, and a net bag is fixedly connected at the right end of the tapered pipe and in communication with the connection pipe; and a fish suction mechanism, disposed on the hull structure and capable of sucking fish in the net bag through the connection pipe and conveying the fish onto the hull structure.

In the above trawler with a fishing and conveying device, an open-close mechanism is further included. The open-close mechanism is disposed on the connection pipe. When the hull structure moves forward, the open-close mechanism can open the connection pipe; and when the hull structure stops moving, the open-close mechanism can close the connection pipe.

In the above trawler with a fishing and conveying device, the open-close mechanism includes:

a valve body, disposed on the connection pipe and internally provided with a valve cavity, where first through-holes are symmetrically opened on left and right side walls of the valve cavity respectively, and the valve cavity is in communication with the connection pipe through two first through-holes;

a stopper block, disposed to be slidable up and down in the valve cavity, where a connecting rod is slidably disposed in the valve body through a second through-hole, and an end of the connecting rod extends into the valve cavity and is fixedly connected with the stopper block; when the stopper block slides down to the bottom of the valve cavity, the stopper block can block two first through-holes to close the connection pipe; when the stopper block slides up to the valve cavity, two first through-holes are in communication with each other to open the connection pipe; and a driving structure, disposed on the connection pipe and capable of driving the connecting rod to slide up and down.

In the above trawler with a fishing and conveying device, the driving structure includes:

a piston cylinder, fixed on the connection pipe, where a piston rod is slidably disposed in the piston cylinder, a piston is fixed at a lower end of the piston rod and slidably disposed in the piston cylinder, the piston separates the piston cylinder into an upper cavity and a lower cavity, a drain hole is opened on the top of the piston cylinder and in communication with the upper cavity, a first reset spring is sleeved on the piston rod, one end of the first reset spring is fixedly connected with the top of the upper cavity, and the other end of the first reset spring is fixedly connected with the piston;

a connection plate, where an upper end of the piston rod penetrates through the piston cylinder and is fixedly connected with the connection plate, and an upper end of the connecting rod penetrates through the valve body and is fixedly connected with the connection plate; and a pressurizing structure, disposed on the fixing frame and capable of pressurizing the lower cavity to push the piston to move upward when impacted by water flow.

In the above trawler with a fishing and conveying device, the pressurizing structure includes:

a fixing block, fixed at an outer side of the fixing frame; and a receiving groove, opened on a left side surface of the fixing block, where an elastic rubber membrane is disposed on the top of the receiving groove, the receiving groove is filled with liquid, and the bottom of the receiving groove is connected with the lower cavity in the piston cylinder through a conveying pipe.

In the above trawler with a fishing and conveying device, the fish suction mechanism includes:

a fish suction pump, fixed on the hull structure, where a fish cabin is disposed in the hull structure, and an outlet of the fish suction pump is in communication with the fish cabin through a pipe; and a fish suction pipe, with one end fixedly connected with a right end of the connection pipe and the other end connected with an inlet of the fish suction pump.

In the above trawler with a fishing and conveying device, a rubber block is disposed on the top of the fixing frame, and there is at least one position where the rubber block is in contact with the mounting plate when the third winch takes up the third wire rope on the drum.

In the above trawler with a fishing and conveying device, the first driving unit includes:

a first winch, fixed on the hull structure, where a first wire rope is wound on a drum of the first winch, and a free end of the first wire rope is fixedly connected with an end of the first rotary rod away from the first hinge shaft; and a first limiting column, vertically fixed on the hull structure and coining into contact with the first rotary rod when the first rotary rod rotates to be vertically upward.

In the above trawler with a fishing and conveying device, the second driving unit includes:

a second winch, fixed on the hull structure, where a second wire rope is wound on a drum of the second winch, and a free end of the second wire rope is fixedly connected with an end of the second rotary rod away from the second hinge shaft; and a second limiting column, vertically fixed on the hull structure and coining into contact with the second rotary rod when the second rotary rod rotates to be vertically upward.

A fishing method using the trawler with a fishing and conveying device includes the following steps.

At step 1), in an initial state, the fishing net on the first rotary rod is detachably connected with the fixing frame through a first flange and a second flange, the first winch is started to release the first wire rope on the drum of the first winch so that the first rotary rod rotates to be in a horizontal state, and at the same time, the second winch is started to release the second wire rope on the drum of the second winch so that the second rotary rod rotates to be in a horizontal state.

At step 2), the third winch is started to release the third wire rope on the drum of the third winch so as to lower the fixing frame into water, and then, the trawler is started to enable the hull structure to move forward, and the fishing net is opened, so that the fish enter the fishing net and the water flow impacts the spiral deflector on the tapered pipe at the same time to drive the tapered pipe to rotate so as to form rotational flow at the left side of the tapered pipe, thus sucking the fish in the fishing net into the net bag.

At step 3), due to forward movement of the hull structure, the water flow impacts the elastic rubber membrane at the top of receiving groove to enable the elastic rubber membrane to be concaved inwardly, so that the liquid in the receiving groove is discharged into the lower cavity of the piston cylinder through the conveying pipe to push the piston and the piston cylinder to move upward, the connection plate moves upward, the connecting rod drives the stopper block to move upward to open the connection pipe, and the fish suction pump is started at the same time to suck the fish in the net bag into the fish cabin through the connection pipe.

Compared with the prior art, the present disclosure has the following advantages.

1. When the trawler starts fishing, the fishing net on the first rotary rod is detachably connected with the left end of the fixing frame, the first driving unit and the second driving unit are started at the same time to drive the first rotary rod to rotate toward an outer side of the hull structure to be in the horizontal state and drive the second rotary rod to rotate toward the outer side of the hull structure to be in the horizontal state, the third winch is started to release the third wire rope on the drum of the third winch to lower the fixing frame into water. When the hull structure moves forward, the fishing net is opened, the fish enter the fishing net, the water flow impacts the spiral deflector on the tapered pipe to drive the tapered pipe to rotate so as to form the rotational flow at the left end of the tapered pipe, and the fish in the fishing net are sucked into the net bag of the fixing frame and then, the fish suction mechanism is started to suck the fish in the net bag through the connection pipe and convey the fish onto the hull structure. Therefore, the actions of releasing and taking up the net are eliminated, the fishing efficiency is improved, and the work load is reduced at the same time, thereby saving time and labour.

2. When fishing is started, the hull structure moves forward, and the open-close mechanism opens the connection pipe to enable the fish suction mechanism to suck the fish in the net bag through the connection pipe. When the fishing operation is paused, the hull structure stops moving, the tapered pipe stops rotating, and only a small amount of fish enters the net bag through the tapered pipe. At this time, the open-close mechanism closes the connection pipe, and the fish suction mechanism also stops working. In this way, the fish suction mechanism is prevented from sucking a large amount of water onto the hull structure through its useless work and thus resulting in the energy wastes.

3. When it is required to open the connection pipe, the driving structure is started to drive the connecting rod to slide up and pull the stopper block to slide up along the valve cavity, the stopper block gradually moves away from two first through-holes to enable the two first through-holes to be in communication with each other so as to open the connection pipe, so that the fish suction mechanism may suck the fish in the net bag. When it is required to close the connection pipe, the driving structure is started to drive the connecting rod to slide down and push the stopper block to slide down along the valve cavity, the stopper block is inserted between two first through-holes to block two first through-holes so as to close the connection pipe, and the fish suction mechanism stops working. Therefore, the operation is simple, safe and reliable.

4. When the hull structure moves forward, the water flow impacts the elastic rubber membrane at the top of the receiving groove to enable the elastic rubber membrane to be concaved inwardly, the liquid in the receiving groove is squeezed into the lower cavity of the piston cylinder through the conveying pipe to increase a pressure of the lower cavity of the piston cylinder and push the piston and the piston rod to move upward, the first reset spring is compressed to drive the connection plate and the connecting rod to move upward and pull the stopper block to move upward along the valve cavity so as to enable two first through-holes to be in communication with each other and open the connection pipe. When the hull structure stops moving forward, the elastic rubber membrane is no longer impacted by the water flow, the piston is pushed to move downward under the action of the first reset spring to drive the piston rod and the connection plate to move downward and drive the stopper block to move downward through the connecting rod so as to block two first through-holes and close the connection pipe. Therefore, the structure is simple.

5. When the hull structure moves forward, the fish suction pump is started to suck the fish in the net bag into the fish cabin through the connection pipe, so that the fish in the fishing net may be continuously delivered into the net bag, thereby realizing continuous fishing and improving the fishing efficiency.

Numerals of the drawings are described as follows: 1. hull structure, 11. first rotary rod, 111. first hinge shaft, 112. first winch, 113. first limiting column, 114. first wire rope, 12. fishing net, 121. first flange, 122. pulling rope, 13. second rotary rod, 131. second hinge shaft, 132. second winch, 133. second limiting column, 134. second wire rope, 14. fish cabin, 15. fish suction pump, 2. mounting plate, 21. through-hole, 22. third winch, 3. fixing frame, 31. cylindrical frame, 32. tapered frame, 33. tapered pipe, 331. second flange, 332. spiral deflector, 34. rubber block, 4. net bag, 5. connection pipe, 51. valve body, 511. valve cavity, 512. first through-hole, 513. stopper block, 514. connecting rod, 515. second through-hole, 516. connection plate, 6. piston cylinder, 61. piston, 611. upper cavity, 612. lower cavity, 62. piston rod, 63. drain hole, 64. first reset spring, 7. fish suction pipe, 8. fixing block, 81. receiving groove, 82. elastic rubber membrane, 83. conveying pipe, 84. second reset spring.

DETAILED DESCRIPTION OF THE EMBODIMENTS

The following descriptions are specific examples of the present disclosure, and the technical solutions of the present disclosure will be further described in combination with accompanying drawings. However, the present disclosure is not limited to these examples.

Figure 1:
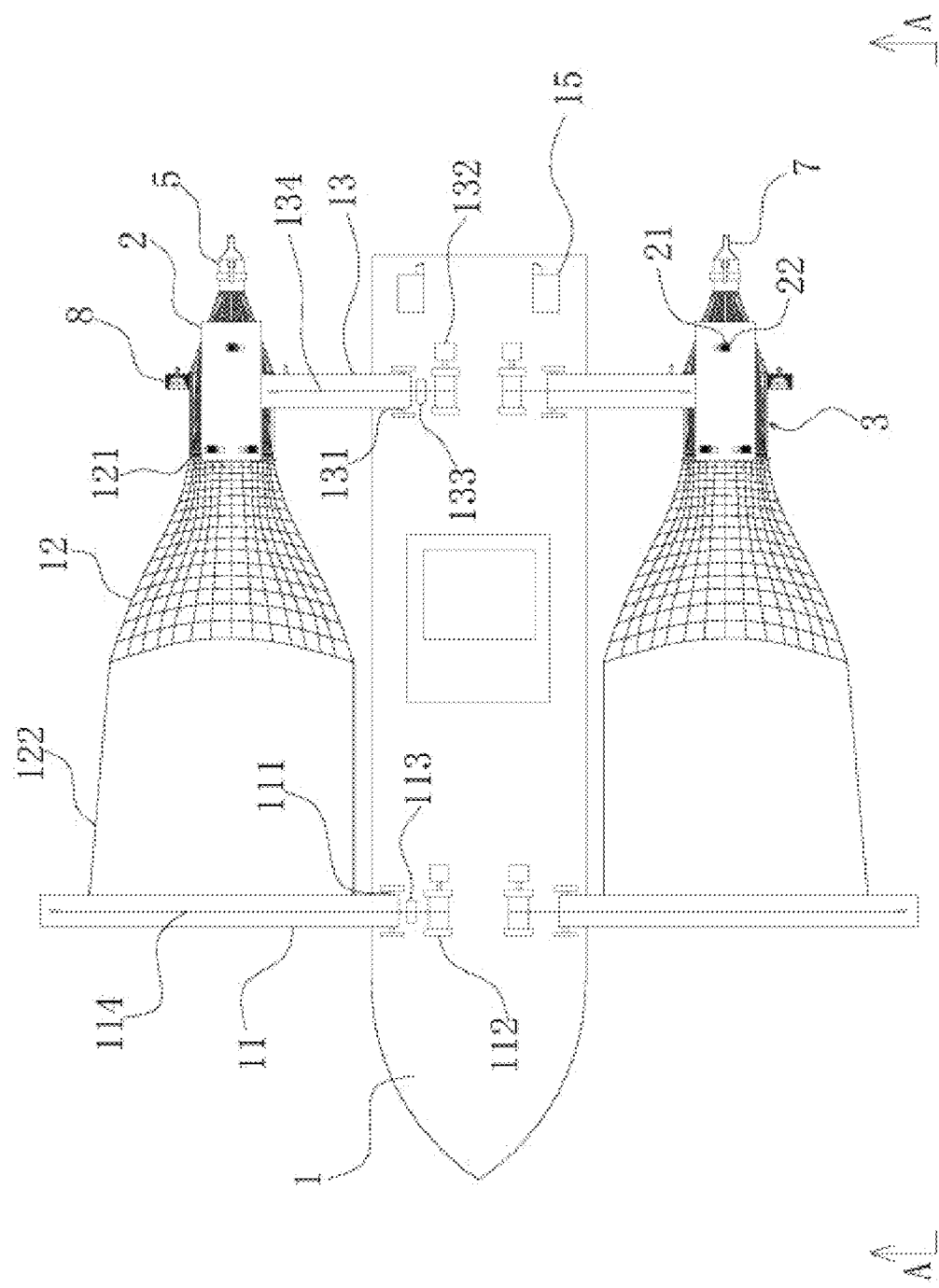
FIG. 1 is a structural schematic diagram of the present disclosure.
Figure 2:
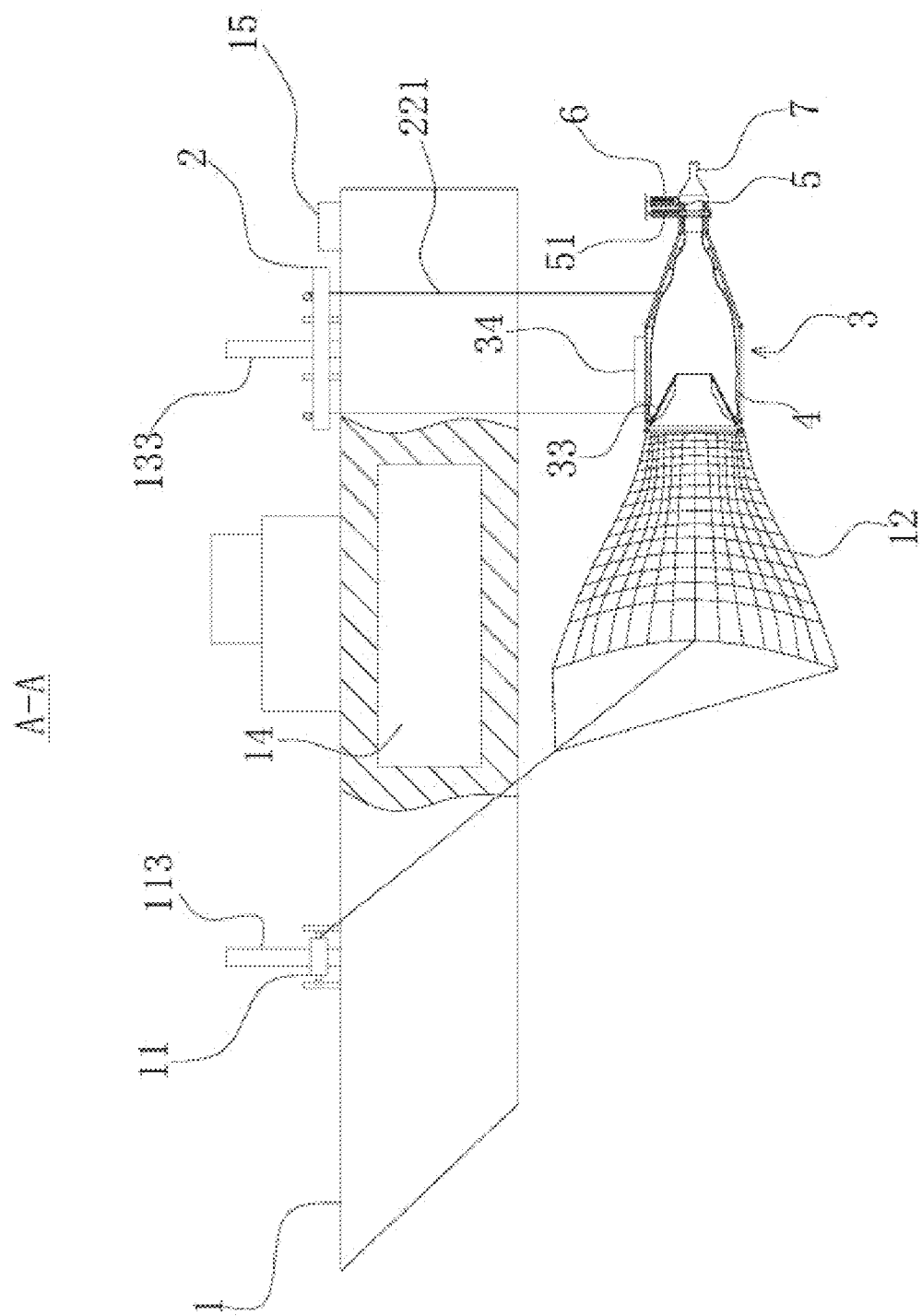
FIG. 2 is a sectional view taken along the position A-A in FIG. 1.
Figure 3:
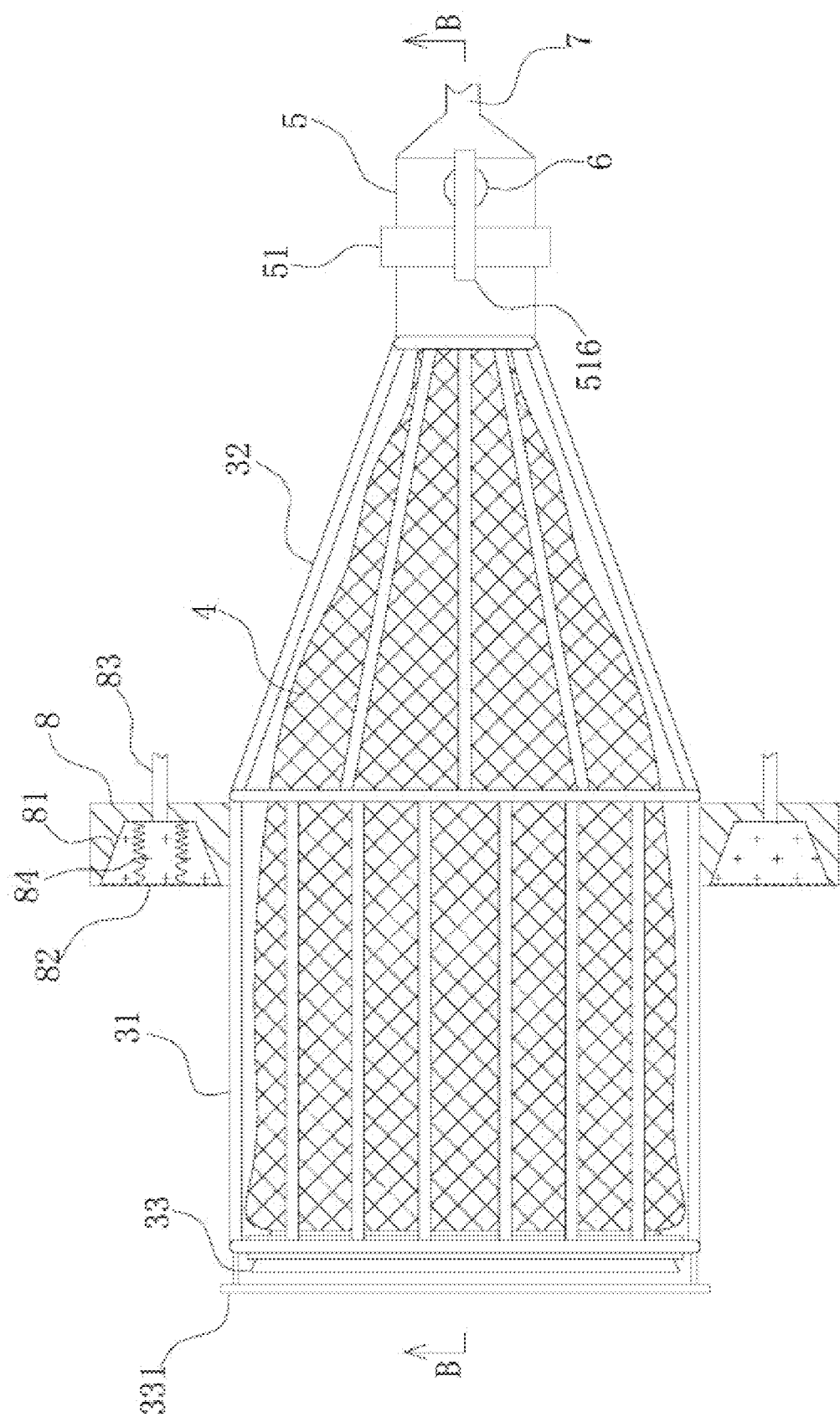
FIG. 3 is a structural schematic diagram illustrating a fixing frame.
Figure 4:
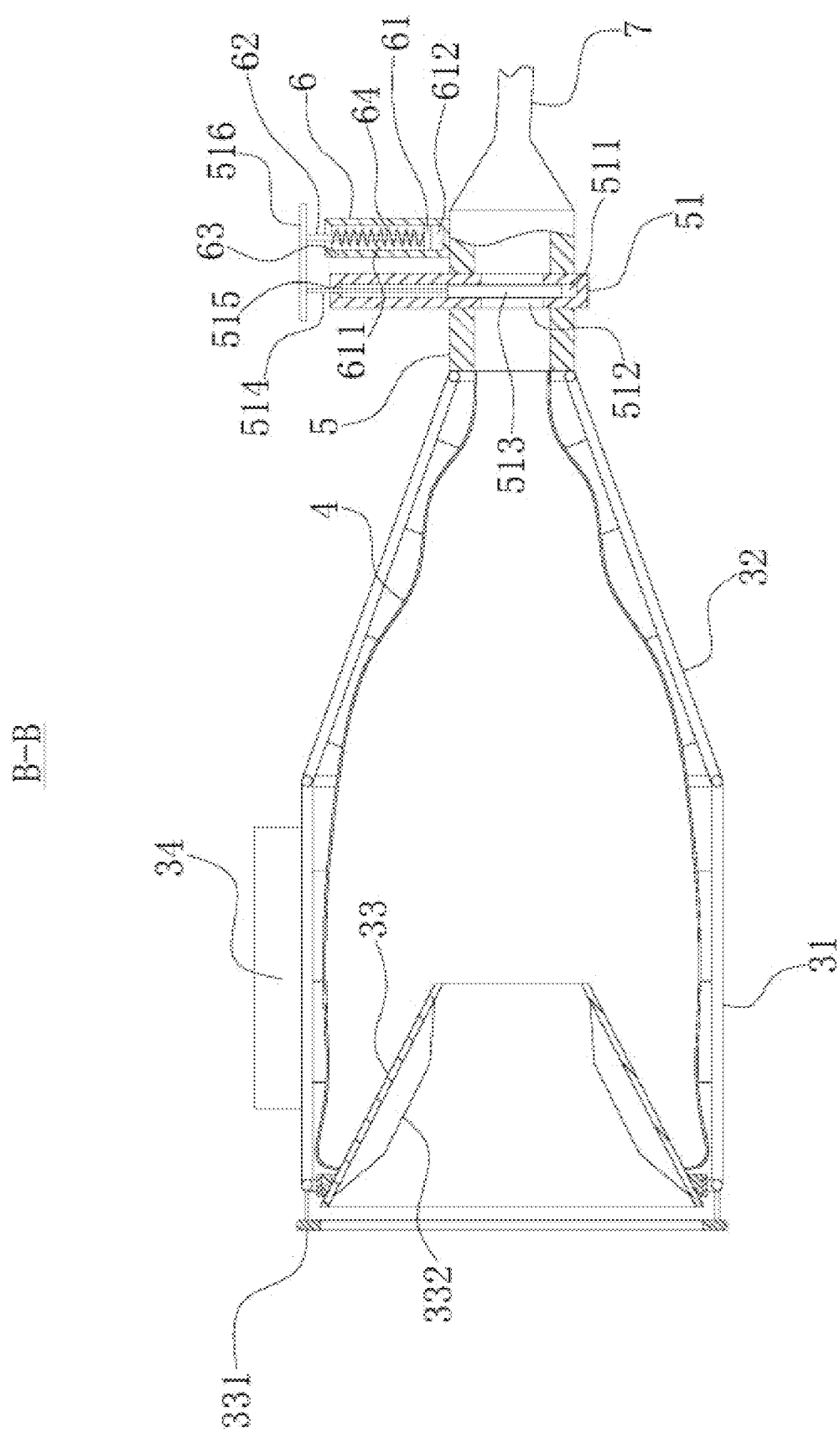
FIG. 4 is a sectional view taken along the position B-B in FIG. 3.

As shown in FIGS. 1-4, a trawler with a fishing and conveying device includes a hull structure 1 and two fishing devices. Two fishing devices are located at the portside and starboard of the hull structure 1 respectively, and the fishing device includes a first rotary rod 11, a first driving unit, a second rotary rod 13, a second driving unit, a fixing frame 3 and a fish suction mechanism.

The first rotary rod 11 is hinged at the bow of the hull structure 1 through a first hinge shaft 111, an axial direction of the first hinge shaft 111 is consistent with a length direction of the hull structure 1, a fishing net 12 is connected on the first rotary rod 11 through a pulling rope 122, and a first flange 121 is fixed on the fishing net 12.

The first driving unit can drive the first rotary rod 11 to rotate around the first hinge shaft 111.

The second rotary rod 13 is hinged at the stern of the hull structure 1 through a second hinge shaft 131, an axial direction of the second hinge shaft 131 is consistent with the length direction of the hull structure 1, a mounting plate 2 is fixed at an end of the second rotary rod 13 away from the second hinge shaft 131, the mounting plate 2 is provided with a through-hole 21 and a third winch 22, and a third wire rope 221 is wound on a drum of the third winch 22.

The second driving unit can drive the second rotary rod 13 to rotate around the second hinge shaft 131.

A free end of the third wire rope 221 passes through the through-hole 21 and is fixedly connected with the fixing frame 3, a second flange 331 is fixed at a left end of the fixing frame 3, the fixing frame 3 is detachably connected with the fishing net 12 through the first flange 121 and the second flange 331, a connection pipe 5 is fixed at a right end of the fixing frame 3, a tapered pipe 33 is rotatably disposed in an opening at the left end of the fixing frame 3, an opening at a left end of the tapered pipe 33 is greater than an opening at a right end of the tapered pipe 33, a spiral deflector 332 is disposed on an inner side wall of the tapered pipe 33, and a net bag 4 is fixedly connected at the right end of the tapered pipe 33 and in communication with the connection pipe 5.

Preferably, three third winches 22 are fixedly disposed on the mounting plate 2. Two third winches 22 are located at a front part of the mounting plate 2, and another third winch 22 is located at a rear part of the mounting plate 2. Three through-holes 21 are opened on the mounting plate 2 and in one-to-one correspondence with three third winches 22. The third wire rope 221 on the drum of the third winch 22 passes through the corresponding through-hole 21 to be fixedly connected with the fixing frame 3.

Preferably, the fixing frame 3 includes a cylindrical frame 31 and a tapered frame 32. A left end of the tapered frame 32 is fixedly connected with a right end of the cylindrical frame 31, the tapered pipe 33 is rotatably disposed in an opening at a left end of the cylindrical frame 31, and a right end of the tapered frame 32 is fixedly connected with the connection pipe 5.

When fish in the fishing net 12 are sucked into the net bag 4, since the net bag 4 is disposed in the fixing frame 3, the net bag 4 in the tapered frame 32 shrinks gradually to enable the water flow to directly bring the fish to the vicinity of the connection pipe 5, thereby improving the fish suction efficiency.

The fish suction mechanism is disposed on the hull structure 1, and can suck the fish in the net bag 4 through the connection pipe 5 and convey the fish onto the hull structure 1.

When the trawler starts fishing, the fishing net 12 on the first rotary rod 11 is detachably connected with the second flange 331 at the left end of the fixing frame 3 through the first flange 121, the first driving unit and the second driving unit are started at the same time to drive the first rotary rod 11 to rotate toward the outer side of the hull structure 1 to be in the horizontal state and drive the second rotary rod 13 to rotate toward the outer side of the hull structure 1 to be in the horizontal state, the third winch 22 is started to release the third wire rope 221 on the drum of the third winch 22 so as to lower the fixing frame 3 into water. When the hull structure 1 moves forward, the fishing net 12 is opened, the fish enter the fishing net 12, the water flow impacts the spiral deflector 332 on the tapered pipe 33 to drive the tapered pipe 33 to rotate so as to form rotational flow at the left end of the tapered pipe 33, and the fish in the fishing net 12 are sucked into the net bag 4 of the fixing frame 3, and then, the fish suction mechanism is started to suck the fish in the net bag 4 and convey the fish onto the hull structure 1 through the connection pipe 5. Therefore, the actions of releasing and taking up the net are eliminated, the fishing efficiency is improved, and the work load is reduced at the same time, saving time and labour.

Specifically, an open-close mechanism is further included. The open-close mechanism is disposed on the connection pipe 5. When the hull structure 1 moves forward, the open-close mechanism can open the connection pipe 5; when the hull structure 1 stops moving, the open-close mechanism can close the connection pipe 5.

When fishing is started, the hull structure 1 moves forward, and the open-close mechanism opens the connection pipe 5 to enable the fish suction mechanism to suck the fish in the net bag 4 through the connection pipe 5. When the fishing operation is paused, the hull structure 1 stops moving, the tapered pipe 33 stops rotating, and only a small amount of fish enters the net bag 4 through the tapered pipe 33; at this time, the open-close mechanism closes the connection pipe 5, and the fish suction mechanism also stops working. In this way, the fish suction mechanism is prevented from sucking a large amount of water onto the hull structure through its useless work and thus resulting in the energy wastes.

Specifically, the open-close mechanism includes a valve body 51, a stopper block 513 and a driving structure.

The valve body 51 is disposed on the connection pipe 5 and internally provided with a valve cavity 511, first through-holes 512 are symmetrically opened on left and right side walls of the valve cavity 511 respectively, and the valve cavity 511 is in communication with the connection pipe 5 through two first through-holes 512.

The stopper block 513 is disposed to be slidable up and down in the valve cavity 511, a second through-hole 515 is disposed on the top of the valve body 51, the connecting rod 514 is slidably disposed in the valve body 51 through the second through-hole 515, and an end of the connecting rod 514 extends into the valve cavity 511 and is fixedly connected with the stopper block 513. When the stopper block 513 slides down to the bottom of the valve cavity 511, the stopper block 513 can block two first through-holes 512 to close the connection pipe 5; when the stopper block 513 slides up to the valve cavity 511, two first through-holes 512 are in communication with each other to open the connection pipe 5.

The driving structure is disposed on the connection pipe 5, and can drive the connecting rod 514 to slide up and down.

When it is required to open the connection pipe 5, the driving structure is started to drive the connecting rod 514 to slide up and pull the stopper block 513 to slide up along the valve cavity 511, the stopper block 513 gradually moves away from two first through-holes 512 to enable the first through-holes to be in communication with each other so as to open the connection pipe 5, so that the fish suction mechanism may suck the fish in the net bag 4. When it is required to close the connection pipe 5, the driving structure is started to drive the connecting rod 514 to slide down and push the stopper block 513 to slide down along the valve cavity 511, the stopper block 513 is inserted between two first through-holes 512 to block two first through-holes 512 so as to close the connection pipe 5, and the fish mechanism stops working. Therefore, the operation is simple, safe and reliable.

Specifically, the driving structure includes a piston cylinder 6, a connection plate 516 and a pressurizing structure.

The piston cylinder 6 is fixed on the connection pipe 5, a piston rod 62 is slidably disposed in the piston cylinder 6, a piston 61 is fixed at a lower end of the piston rod 62 and slidably disposed in the piston cylinder 6, the piston 61 and the piston cylinder 6 are sealingly disposed, the piston 61 separates the piston cylinder 6 into an upper cavity 611 and a lower cavity 612, a drain hole 63 is opened on the top of the piston cylinder 6 and in communication with the upper cavity 611, a first reset spring 64 is sleeved on the piston rod 62, one end of the first reset spring 64 is fixedly connected with the top of the upper cavity 611, and the other end of the first reset spring 64 is fixedly connected with the piston 61.

An upper end of the piston rod 62 penetrates through the piston cylinder 6 to be fixedly connected with the connection plate 516, and an upper end of the connecting rod 514 penetrates through the valve body 51 to be fixedly connected with the connection plate 516.

The pressurizing structure is disposed on the fixing frame 3. When impacted by the water flow, the pressurizing structure can pressurize the lower cavity 612 to push the piston 61 to move upward.

When the hull structure 1 moves forward, the water flow impacts the pressurizing structure, the pressurizing structure pressurizes the lower cavity 612 of the piston cylinder 6 to push the piston 61 and the piston rod 62 to move upward, and the first reset spring 64 is compressed to drive the connection plate 516 and the connecting rod 514 to move upward and pull the stopper block 513 to move upward along the valve cavity 511 so as to enable two first through-holes 512 to be in communication with each other and thus open the connection pipe 5. When the hull structure 1 stops moving forward, the pressurizing structure is no longer impacted by the water flow, the piston 61 and the piston rod 62 are pushed to move downward under the action of the first reset spring 64 to drive the connection plate 516 to move downward and drive the stopper block 513 to move downward through the connecting rod 514 so as to block two first through-holes 512 and thus close the connection pipe 5. Therefore, the structure is simple.

Specifically, the pressurizing structure includes a fixing block 8 and a receiving groove 81.

The fixing block 8 is fixed at an outer side of the fixing frame 3. Preferably, the fixing block 8 is cylindrical.

The receiving groove 81 is opened on a left side surface of the fixing block 8, an elastic rubber membrane 82 is disposed on the top of the receiving groove 81, the receiving groove 81 is filled with liquid, and the bottom of the receiving groove 81 is connected with the lower cavity 612 in the piston cylinder 6 through a conveying pipe 83.

Preferably, several second reset springs 84 are disposed in the receiving groove 81. One end of the second reset spring 84 is fixedly connected with the elastic rubber membrane 82, and the other end of the second reset spring 84 is fixedly connected with the bottom of the receiving groove 81.

When the hull structure 1 moves forward, the water flow impacts the elastic rubber membrane 82 on the top of the receiving groove 81 to enable the elastic rubber membrane 82 to be concaved inwardly, the second reset spring 84 is compressed, the liquid in the receiving groove 81 is discharged into the lower cavity 612 of the piston cylinder 6 through the conveying pipe 83 to increase the pressure of the lower cavity 612 of the piston cylinder 6 and push the piston 61 and the piston rod 62 to move upward, and the first reset spring 64 is compressed to drive the connection plate 516 and the connecting rod 514 to move upward and pull the stopper block 513 to move upward along the valve cavity 511 so as to enable two first through-holes 512 to be in communication with each other and thus open the connection pipe 5. When the hull structure 1 stops moving forward, the elastic rubber membrane 82 is no longer impacted by the water flow, the piston 61 is pushed to move downward under the actions of the first reset spring 64 and the second reset spring 84 to drive the piston rod 62 and the connection plate 516 to move downward and drive the stopper block 513 to move downward through the connecting rod 514 so as to block two first through-holes 512 and thus close the connection pipe 5. Therefore, the structure is simple.

Specifically, the fish suction mechanism includes a fish suction pump 15 and a fish suction pipe 7.

The fish suction pump 15 is fixed on the hull structure 1, a fish cabin 14 is disposed in the hull structure 1, and an outlet of the fish suction pump 15 is in communication with the fish cabin 14 through a pipe.

One end of the fish suction pipe 7 is fixedly connected with a right end of the connection pipe 5, and the other end of the fish suction pipe 7 is connected with an inlet of the fish suction pump 15.

When the hull structure 1 moves forward, the fish suction pump 15 is started to suck the fish in the net bag 4 into the fish cabin 14 through the connection pipe 5, so that the fish in the fishing net 12 may be continuously sucked into the net bag 4, thereby realizing continuous fishing and improving the fishing efficiency.

Specifically, a rubber block 34 is disposed on the top of the fixing frame 3, and there is at least one position where the rubber block 34 is in contact with the mounting plate 2 when the third winch 22 takes up the third wire rope 221 on the drum.

After fishing is ended, the third wire rope 221 on the drum of the third winch 22 is taken up to drive the fixing frame 3 to move upward, so that the rubber block 34 on the fixing frame 3 finally comes into contact with the lower side surface of the mounting plate 2. The rubber block 34 can prevent the fixing frame 3 from directly bumping onto the mounting plate 2, and thus has a buffering effect.

Specifically, the first driving unit includes a first winch 112 and a first limiting column 113.

The first winch 112 is fixed on the hull structure 1, the first wire rope 114 is wound on the drum of the first winch 112, and a free end of the first wire rope 114 is fixedly connected with an end of the first rotary rod 11 away from the first hinge shaft 111.

The first limiting column 113 is vertically fixed on the hull structure 1 and comes into contact with the first rotary rod 11 when the first rotary rod 11 rotates to be vertically upward.

The first winch 112 is started to realize rotation of the first rotary rod 11 around the first hinge shaft 111 by taking up and releasing the first wire rope 114 on the drum of the first winch 112, therefore the operation is simple. In addition, when the first winch 112 takes up the first wire rope 114, the first rotary rod 11 is driven to rotate to be in a vertical state. At this time, the first rotary rod 11 is in contact with the first limiting column 113, and the first limiting column 113 can limit a rotation range of the first rotary rod 11 to enable the first rotary rod 11 to maintain the vertical state, thereby preventing the first rotary rod 11 from swinging.

Specifically, the second driving unit includes a second winch 132 and a second limiting column 133.

The second winch 132 is fixed on the hull structure 1, a second wire rope 134 is wound on the drum of the second winch 132, and a free end of the second wire rope 134 is fixedly connected with an end of the second rotary rod 13 away from the second hinge shaft 131.

The second limiting column 133 is vertically fixed on the hull structure 1 and comes into contact with the second rotary rod 13 when the second rotary rod 13 rotates to be vertically upward.

The second winch 132 is started to realize rotation of the second rotary rod 13 around the second hinge shaft 131 by taking up and releasing the second wire rope 134 on the drum of the second winch 132, and therefore the operation is simple. In addition, when the second winch 132 takes up the second wire rope 134, the second rotary rod 13 is driven to rotate to be in the vertical state. At this time, the second rotary rod 13 is in contact with the second limiting column 133, and the second limiting column 133 can limit a rotation range of the second rotary rod 13 to enable the second rotary rod 13 to maintain the vertical state, thereby preventing the second rotary rod 13 from swinging.

A fishing method using the trawler with a fishing and conveying device includes the following steps.

At step 1), in an initial state, the fishing net 12 on the first rotary rod 11 is detachably connected with the fixing frame 3 through the first flange 121 and the second flange 331, the first winch 112 is started to release the first wire rope 114 on the drum of the first winch 112 to enable the first rotary rod 11 to rotate to be in the horizontal state, and at the same time, the second winch 132 is started to release the second wire rope 134 on the drum of the second winch 132 so as to enable the second rotary rod 13 to rotate to be in the horizontal state.

At step 2), the third winch 22 is started to release the third wire rope 221 on the drum of the third winch 22 to lower the fixing frame 3 into water, and then, the trawler is started to enable the hull structure 1 to move forward, and the fishing net 12 is opened, the fish enter the fishing net 12 and the water flow impacts the spiral deflector 332 on the tapered pipe 33 at the same time to drive the tapered pipe 33 to rotate and form rotational flow at the left side of the tapered pipe 33 so as to suck the fish in the fishing net 12 into the net bag 4.

At step 3), due to the forward movement of the hull structure 1, the water flow impacts the elastic rubber membrane 82 on the top of the receiving groove 81 to enable the elastic rubber membrane 82 to be concaved inwardly, the liquid in the receiving groove 81 is discharged into the lower cavity 612 of the piston cylinder 6 through the conveying pipe 83 to push the piston 61 and the piston cylinder 62 to move upward, the connection plate 516 moves upward and the connecting rod 514 drives the stopper block 513 to move upward to open the connection pipe 5, and the fish suction pump 15 is started at the same time to suck the fish in the net bag 4 into the fish cabin 14 through the connection pipe 5.

When the trawler starts fishing, the hull structure 1 moves forward, the water flow impacts the tapered pipe 33 to drive the tapered pipe 33 to rotate. Since the spiral deflector 332 is disposed on the tapered pipe 33 to allow formation of the rotating flow at the left side of the tapered pipe 33, the fish in the fishing net 12 are sucked into the net bag 4, and then, the fish in the net bag 4 are sucked into the fish cabin 14 by the fish suction pump 15. When the trawler moves forward, the fishing net 12 may perform fishing continuously without being limited by the capacity of the fishing net 12, thereby improving the fishing efficiency.

In the descriptions of the present disclosure, it is to be understood that an orientation or position relationship indicated by terms such as "upper", "lower", "inside" and "outside" is an orientation or position relationship shown based on the accompanying drawings. These terms are merely used to facilitate describing the present disclosure and simplifying the description rather than indicate or imply that an indicated device or element should have a particular orientation or be constructed and operated in the particular orientation, and thus shall not be understood as limiting to the present disclosure.

The specific examples described herein are merely illustrative of the spirit of the present disclosure. Persons skilled in the art may make various modifications or supplementations or substitutions in a similar manner to the described specific examples without departing from the spirit of the present disclosure or surpassing the scope defined in the appended claims.

We claim:

1. A trawler with a fishing and conveying device, comprising a hull structure (1) and two fishing devices, wherein the two fishing devices are located at portside and starboard of the hull structure (1) respectively, and each of the fishing device comprises:
   a first rotary rod (11), hinged at the bow of the hull structure (1) through a first hinge shaft (111), wherein an axial direction of the first hinge shaft (111) is consistent with a length direction of the hull structure (1), and a fishing net (12) is connected on the first rotary rod (11);
   a first driving unit, being capable of driving the first rotary rod (11) to rotate around the first hinge shaft (111);
   a second rotary rod (13), hinged at the stern of the hull structure (1) through a second hinge shaft (131), wherein an axial direction of the second hinge shaft (131) is consistent with the length direction of the hull structure (1), a mounting plate (2) is fixed at an end of the second rotary rod (13) away from the second hinge shaft (131), the mounting plate (2) is provided with a through-hole (21) and a third winch (22), and a third wire rope (221) is wound on a drum of the third winch (22);
   a second driving unit, being capable of driving the second rotary rod (13) to rotate around the second hinge shaft (131);
   a fixing frame (3), wherein a free end of the third wire rope (221) passes through the through-hole (21) to be fixedly connected with the fixing frame (3), a left end of the fixing frame (3) is detachably connected with the bottom of the fishing net (12), a connection pipe (5) is fixedly disposed at a right end of the fixing frame (3), a tapered pipe (33) is rotatably disposed in an opening at the left end of the fixing frame (3), an opening at a left end of the tapered pipe (33) is greater than an opening at a right end of the tapered pipe (33), a spiral deflector (332) is disposed on an inner side wall of the tapered pipe (33), and a net bag (4) is fixedly connected at a right end of the tapered pipe (33) and in communication with the connection pipe (5); and
   a fish suction mechanism, disposed on the hull structure (1) and capable of sucking fish in the net bag (4) through the connection pipe (5) and conveying the fish onto the hull structure (1).

2. The trawler with a fishing and conveying device according to claim 1, further comprising an open-close mechanism, wherein the open-close mechanism is disposed on the connection pipe (5); when the hull structure (1) moves forward, the open-close mechanism is capable of opening the connection pipe (5); when the hull structure (1) stops moving, the open-close mechanism is capable of closing the connection pipe (5).

3. The trawler with a fishing and conveying device according to claim 2, wherein the open-close mechanism comprises:
   a valve body (51), disposed on the connection pipe (5) and internally provided with a valve cavity (511), wherein first through-holes (512) are symmetrically opened on left and right side walls of the valve cavity (511) respectively, and the valve cavity (511) is in communication with the connection pipe (5) through two first through-holes (512);
   a stopper block (513), disposed to be slidable up and down in the valve cavity (511), wherein a connecting rod (514) is slidably disposed in the valve body (51) through a second through-hole (515), and an end of the connecting rod (514) extends into the valve cavity (511) to be fixedly connected with the stopper block (513); when the stopper block (513) slides down to the bottom of the valve cavity (511), the stopper block (513) is capable of blocking two first through-holes (512) to close the connection pipe (5); when the stopper block (513) slides up to the valve cavity (511), two first through-holes (512) are in communication with each other to open the connection pipe (5); and
   a driving structure, disposed on the connection pipe (5) and capable of driving the connecting rod (514) to slide up and down.

4. The trawler with a fishing and conveying device according to claim 3, wherein the driving structure comprises:
   a piston cylinder (6), fixed on the connection pipe (5), wherein a piston rod (62) is slidably disposed in the piston cylinder (6), a piston (61) is fixed at a lower end of the piston rod (62) and slidably disposed in the piston cylinder (6), the piston (61) separates the piston cylinder (6) into an upper cavity (611) and a lower cavity (612), a drain hole (63) is opened on the top of the piston cylinder (6) and in communication with the upper cavity (611), a first reset spring (64) is sleeved on the piston rod (62), one end of the first reset spring (64) is fixedly connected with the top of the upper cavity (611), and the other end of the first reset spring (64) is fixedly connected with the piston (61);
   a connection plate (516), wherein an upper end of the piston rod (62) penetrates through the piston cylinder (6) to be fixedly connected with the connection plate (516), and an upper end of the connecting rod (514) penetrates through the valve body (51) to be fixedly connected with the connection plate (516); and
   a pressurizing structure, disposed on the fixing frame (3) and capable of pressurizing the lower cavity (612) to push the piston (61) to move upward when impacted by water flow.

5. The trawler with a fishing and conveying device according to claim 4, wherein the pressurizing structure comprises:
   a fixing block (8), fixed at an outer side of the fixing frame (3); and
   a receiving groove (81), opened on a left side surface of the fixing block (8), wherein an elastic rubber membrane (82) is disposed on the top of the receiving groove (81), the receiving groove (81) is filled with liquid, and the bottom of the receiving groove (81) is connected with the lower cavity (612) in the piston cylinder (6) through a conveying pipe (83).

6. The trawler with a fishing and conveying device according to claim 5, wherein the fish suction mechanism comprises:

a fish suction pump (15), fixed on the hull structure (1), wherein a fish cabin (14) is disposed in the hull structure (1), and an outlet of the fish suction pump (15) is in communication with the fish cabin (14) through a pipe; and a fish suction pipe (7), with one end fixedly connected with a right end of the connection pipe (5) and the other end connected with an inlet of the fish suction pump (15).

7. The trawler with a fishing and conveying device according to claim 6, wherein a rubber block (34) is disposed on the top of the fixing frame (3), and there is at least one position where the rubber block (34) is in contact with the mounting plate (2) when the third winch (22) takes up the third wire rope (221) on the drum.

8. The trawler with a fishing and conveying device according to claim 7, wherein the first driving unit comprises:

a first winch (112), fixed on the hull structure (1), wherein a first wire rope (114) is wound on a drum of the first winch (112), and a free end of the first wire rope (114) is fixedly connected with an end of the first rotary rod (11) away from the first hinge shaft (111); and a first limiting column (113), vertically fixed on the hull structure (1) and coming into contact with the first rotary rod (11) when the first rotary rod (11) rotates to be vertically upward.

9. The trawler with a fishing and conveying device according to claim 8, wherein the second driving unit comprises:

a second winch (132), fixed on the hull structure (1), wherein a second wire rope (134) is wound on a drum of the second winch (132), and a free end of the second wire rope (134) is fixedly connected with an end of the second rotary rod (13) away from the second hinge shaft (131); and a second limiting column (133), vertically fixed on the hull structure (1) and coining into contact with the second rotary rod (13) when the second rotary rod (13) rotates to be vertically upward.

10. A fishing method using a trawler with a fishing and conveying device, comprising the following steps:

at step 1), in an initial state, detachably connecting a fishing net on a first rotary rod with a fixing frame through a first flange and a second flange; starting a first winch to release a first wire rope (114) on a drum of the first winch (112) to enable the first rotary rod (11) to be rotated in a horizontal state, and simultaneously, starting a second winch (132) to release a second wire rope (134) on a drum of the second winch (132) to enable a second rotary rod (13) to be rotated in a horizontal state;

at step 2), starting a third winch (22) to release a third wire rope (221) on a drum of the third winch (22) to lower the fixing frame (3) into water, and then, starting the trawler to enable a hull structure (1) to move forward and opening the fishing net (12) to allow fish to enter the fishing net (12) by a water flow; using a spiral deflector (332) on a tapered pipe (33) to drive the tapered pipe (33) to rotate and form a rotational flow at a left side of the tapered pipe (33) so as to suck the fish in the fishing net (12) into a net bag (4); and at step 3), due to forward movement of the hull structure, by the water flow, an elastic rubber membrane (82) on a top of a receiving groove (81) to enable to the elastic rubber membrane (82) to be concaved inwardly, discharging a liquid in the receiving groove (81) into a lower cavity (612) of a piston cylinder (6) through a conveying pipe (83) to push a piston (61) and a piston cylinder (62) of the piston cylinder to move upward so that a connection plate (516) moves upward and a connecting rod (514) drives a stopper block (513) to move upward to open a connection pipe (5), and start a fish suction pump (15) simultaneously to suck the fish in the net bag (4) into a fish cabin (14) through the connection pipe (5).

\* \* \* \* \*